2,759,935

Patented Aug. 21, 1956

2,759,935

SUBSTITUTED 3-PHENYLOXINDOLES

Merrill Eugene Speeter, Kalamazoo, Mich., assignor to Bristol Laboratories Inc., Syracuse, N. Y., a corporation of New York No Drawing. Application February 18, 1953, Serial No. 337,656

6 Claims. (Cl. 260—247.2)

This invention relates to a new class of organic compounds of therapeutic value and to methods for the preparation thereof. More particularly, this invention relates to a series of basically substituted 3-phenyloxindoles.

The new compounds of the present invention are the free bases, the acid addition salts, and the quaternary salts of the bases which may be represented by the following general formula:

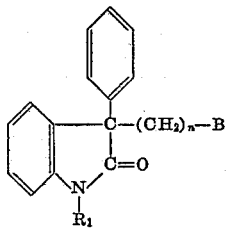

where $R_1$ is alkyl or aralkyl, $n$ is the integer two or three and B is di(lower)alkylamino, piperidino, morpholino, pyrrolidino, lower alkyl-pyrrolidino, N'-alkylpiperazino, or pipecolino.

The compounds of this invention possess useful activity as anti-spasmodic and analgesic agents. The quaternary salts are useful as germicides and disinfectants.

The compounds of this invention are prepared by reacting secondary aromatic amines with acetyl-mandelyl chloride to give acetylmandelanilides which are easily hydrolyzed to mandelanilides which in turn are converted to 1-substituted 3-phenyl-oxindoles by treatment with concentrated sulfuric acid according to the specifications of my copending applications. The 1-substituted-3-phenyl-oxindoles are converted to the 1-substituted-3-substituted-3-phenyl-oxindoles of the present invention according to the following equation

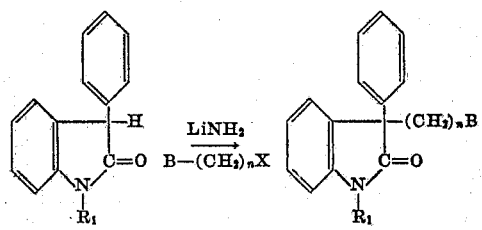

wherein X is halogen and $R_1$, $n$ and B have the same significance as in the general formula above.

The 1-alkyl or aralkyl-3-phenyloxindoles used as starting materials are prepared by the ring closure of mandelanilides using concentrated sulfuric acid as the condensing agent according to the general procedures illustrated by the following examples:

EXAMPLE A

1-methyl-3-phenyloxindole

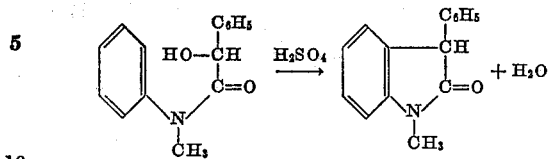

Twenty grams of N-methylmandelanilide were dissolved in a cooled mixture of 80 ml. concentrated sulfuric acid and 10 ml. of water. After four hours at room temperature, the mixture was poured onto ice. The gum which first separated soon solidified. After 12 hours in the cold room the solid was filtered, washed with water, and recrystallized twice from isopropanol. A yield of 17 gm. of crystals melting at 118°–119° was obtained.

Analysis.—Calculated for $C_{15}H_{13}NO$:

|   | Calculated | Found |
|---|---|---|
| C | 80.68 | 80.80 |
| H | 5.85 | 6.02 |

EXAMPLE B

1-ethyl-3-phenyloxindole

Twenty grams of N-ethylmandelanilide were reacted as in Example A. The crystals obtained from isopropanol melted at 95°–97°. Yield, 14 gm.

Analysis.—Calculated for $C_{16}H_{15}NO$:

|   | Calculated | Found |
|---|---|---|
| C | 80.97 | 80.70 |
| H | 6.37 | 6.26 |

EXAMPLE C

1-benzyl-3-phenyloxindole

Thirty grams of N-benzylmandelanilide were dissolved in 150 ml. of concentrated sulfuric acid which had been diluted with 15 ml. of water and cooled. The solid isolated following the method of Example A was recrystallized from isopropanol. Twenty-four grams of product melting at 113–115° were obtained.

Analysis.—Calculated for $C_{21}H_{17}NO$:

|   | Calculated | Found |
|---|---|---|
| C | 84.23 | 84.35 |
| H | 5.72 | 5.83 |

These oxindoles and their method of preparation are the subject of my co-pending application Serial Number 337,655 filed February 18, 1953.

The following examples will serve to illustrate the invention without limiting it thereto.

EXAMPLE I

1-methyl-3-(β-1-piperidylethyl)-3-phenyloxindole

Eighteen grams (0.08 mole) of 1-methyl-3-phenyl-oxindole was refluxed for six hours with 2.3 g. (0.1 mole) of lithium amide in 200 ml. of toluene under anhydrous conditions. Considerable ammonia was evolved throughout the reflux period. A solution of 14.7 g. (0.1 mole) of β-1-piperidylethyl chloride in 100 ml. of dry toluene was then added dropwise over a period of one hour and the mixture was refluxed for eighteen hours. The cooled mixture was poured into water and the toluene layer was separated. The toluene layer was extracted with 400 ml. of 3N hydrochloric acid. The addition of base to these aqueous, acid extracts gave an oil which was extracted into ether. The ether layer was separated and dried and the ether was removed by distillation. The oil remaining was crystallized from petroleum ether of boiling point 85°–100° C. to give 1-methyl-3-(β-1-piperidylethyl)-3-phenyloxindole melting at 76°–78° C.

*Analysis.*—Calculated for $C_{22}H_{26}N_2O$:

|   | Calculated | Found |
|---|---|---|
| C | 79.00 | 78.50 |
| H | 7.83 | 7.76 |
| N | 8.37 | 8.28 |

The free base is converted to an acid addition salt by simple neutralization with the required amount of acid, e. g. hydrochloric acid when the hydrochloride is desired.

The free base is converted to a quaternary salt by heating in the presence of a molar excess of quaternizing agent, e. g. methyl iodide when the methiodide is desired. Dry ether is useful as a diluent.

EXAMPLE II

*1-methyl-3(β-1-pyrrolidylethyl)-3-phenyloxindole*

Following the procedure set forth in Example I, 1-methyl-3-phenyloxindole (0.08 mole) is reacted with 0.1 mole of β-1-pyrrolidylethyl chloride to produce 1-methyl-3(β-1-pyrrolidylethyl)-3-phenyloxindole as an oil which is purified by distillation in vacuo. The free base is converted to the hydrobromide by neutralization with the required amount of hydrobromic acid. The free base is converted to the methosulfate by treatment with dimethyl sulfate.

EXAMPLE III

*1-methyl-3-diethylaminoethyl-3-phenyloxindole*

To a stirred solution of 22 gm. (0.1 mole) of 1-methyl-3-phenyloxindole in 400 ml. of toluene was added 4.6 gm. (0.2 mole) of lithium amide. After four hours of stirring and refluxing, 0.15 mole of diethylaminoethyl chloride was added in 200 ml. of toluene. Refluxing was continued 18 hours. The cooled mixture was then poured into water and shaken up well in a separatory funnel. The toluene layer was extracted with dilute hydrochloric acid. The extracts were made basic and the oil liberated taken into ether and dried. The oil remaining after concentration of the ether solution could not be crystallized nor could crystalline salts be prepared. The oil was distilled under reduced pressure. A main fraction boiling at 211°–215°/4 mm. was obtained weighing 20 grams.

*Analysis.*—Calculated for $C_{21}H_{27}N_2O$:

|   | Calculated | Found |
|---|---|---|
| C | 77.95 | 77.78 |
| H | 8.15 | 8.07 |

Treatment with ethyl chloride converts the free base to the corresponding ethochloride.

EXAMPLE IV

*1-methyl-3-[β-(1-N'-methylpiperazyl)ethyl]-3-phenyloxindole*

Following the procedure used in Example I, 0.08 mole 1-methyl-3-phenyloxindole is treated with lithium amide and 0.1 mole β(1-N'-methylpiperazyl)ethyl bromide to produce 1-methyl-3-[β-(1-N'-methylpiperazyl)-ethyl]-3-phenyloxindole which is purified by distillation in high vacuum and converted to a tartrate by neutralization with the required amount of tartaric acid. The free base is also converted to an ethiodide by warming in the presence of ethyl iodide.

EXAMPLE V

*1-methyl-3-dimethylaminoethyl-3-phenyloxindole*

A mixture of 22 gm. (0.1 mole) of 1-methyl-3-phenyloxindole with 4.6 gm. (0.2 mole) of lithium amide in 300 ml. of toluene was stirred and refluxed for four hours. A dry solution of dimethylaminoethyl chloride (prepared from 28 gm. (0.2 mole) of the hydrochloride salt) in 300 ml. of toluene was added dropwise. After the addition the mixture was refluxed 12 hours and cooled. The mixture was poured into water, the toluene layer separated and extracted with dilute hydrochloric acid. The basic material was liberated from the acid extracts through addition of ammonium hydroxide. The oil was taken into ether, dried and concentrated. Excess dimethylaminoethyl chloride was removed under reduced pressure at 150°. The oil remaining could not be crystallized but a solid hydrochloride salt was prepared which could be crystallized from isopropanol. The salt melted after three recrystallizations at 183°–185°. The salt was evidently solvated as the following analytical data was obtained.

*Analysis.*—Calculated for $C_{19}H_{22}N_2O \cdot HCl$:

|   | Calculated | Found |
|---|---|---|
| C | 68.98 | 66.16 |
| H | 7.40 | 6.79 |

The above sample was dried at 100° in vacuum over phosphorous pentoxide.

A sample dried at 135° over boiling xylene gave the following analytical data in comparison with the calculated values for the monohydrate salt.

*Analysis.*—Calculated for $C_{19}H_{22}N_2O \cdot HCl \cdot H_2O$:

|   | Calculated | Found |
|---|---|---|
| C | 65.43 | 66.18–66.23 |
| H | 7.22 | 6.84–7.01 |
| N | 8.02 | 8.18 |

The hydrochloride salt was converted to the base and a sample distilled. The heavy oil distilled at 194°–198°/3.5 mm. The distilled base gave a hydrochloride salt of the same melting point recorded previously.

*Analysis.*—Calculated for $C_{19}H_{22}N_2O$:

|   | Calculated | Found |
|---|---|---|
| C | 77.51 | 77.32 |
| H | 7.54 | 7.43 |

The free base is converted to the metho-p-toluenesulfonate by treatment with methyl p-toluene-sulfonate.

EXAMPLE VI

*1-methyl-3-[β-(1-α-pipecolyl)ethyl]-3-phenyloxindole*

β-(1-α-pipecolyl)ethyl bromide (0.1 mole) is reacted with 0.08 mole of 1-methyl-3-phenyloxindole previously treated with lithium amide according to the procedure set forth in Example I. There is obtained the free base 1 - methyl - 3 - [β - (1 - α - pipecolyl)ethyl] - 3 - phenyloxindole which is purified by distillation in high vacuum and conversion to a citrate by neutralization with the required amount of citric acid. Treatment of the free base with n-propyl bromide produces the quaternary propobromide salt.

EXAMPLE VII

*1-methyl-3-phenyl-3-morpholinylethyloxindole*

Fifteen grams (0.067 mole) of 1-methyl-3-phenyloxindole was reacted with excess morpholinylethyl chloride with lithium amide as an alkylating agent according to the procedure used in Examples III and V. The basic oil isolated was converted to the hydrochloride salt in dry ether solution with hydrogen chloride. The salt was recrystallized from isopropanol to a constant melting point of 207°–209°.

Analysis.—Calculated for $C_{21}H_{24}N_2O_2 \cdot HCl$:

|   | Calculated | Found |
|---|---|---|
| C | 67.63 | 67.25 |
| H | 6.76 | 6.63 |

Reaction of the basic oil with methyl chloride produces the methochloride.

EXAMPLE VIII

*1-methyl-3-di-n-butylaminoethyl-3-phenyloxindole*

Eighteen grams of 1-methyl-3-phenyloxindole is refluxed for six hours with lithium amide (2.3 g.) in 200 ml. of toluene under anhydrous conditions. Considerable ammonia is evolved throughout the reflux period. A solution of 192 grams of di-n-butylaminoethyl chloride in 100 ml. of dry toluene is then added gradually over sixty minutes and the mixture is refluxed for eighteen hours. The mixture is then cooled and poured into water. The toluene layer is separated and extracted in portions with a total of 400 ml. of 3N sulfuric acid. The addition of aqueous sodium hydroxide to bring these aqueous acid extracts to pH 10.0 or higher gives an oil which is recovered by extraction into ether. The ether layer is separated and dried and the ether is removed by distillation. The remaining material is purified by distillation in high vacuum to yield 1-methyl-3-di-n-butylaminoethyl-3-phenyloxindole, which is converted to the quaternary n-hexobromide salt by treatment with n-hexyl bromide.

EXAMPLE IX

*1-methyl-3-dimethylaminopropyl-3-phenyloxindole*

Twenty-two grams (0.1 mole) of 1-methyl-3-phenyloxindole was reacted with lithium amide and dimethylaminopropyl chloride according to the procedure used in previous examples. A 27.5 gm. yield of basic oil was obtained (89.5%). The oil was converted to the sulfate salt through solution in isopropanol and addition of an equimolecular amount of concentrated acid. After two recrystallizations from isopropanol the salt melted at 176°–178°.

Analysis.—Calculated for $C_{20}H_{24}N_2O \cdot H_2SO_4$:

|   | Calculated | Found |
|---|---|---|
| C | 59.10 | 58.95 |
| H | 6.44 | 6.62 |

The oil is converted to the quaternary methiodide salt by reaction with methyl iodide and removal of solvent and excess methyl iodide by distillation.

EXAMPLE X

*1-methyl-3[γ-(1-piperidyl)propyl]-3-phenyloxindole*

Twenty-two grams of 1-methyl-3-phenyloxindole is reacted with lithium amide and 0.1 mole γ-(1-piperidyl)propyl bromide according to the procedure used in previous examples. The free base obtained is purified by distillation in vacuo and converted to the hydrochloride and ethobromide by reaction with hydrochloric acid and ethyl bromide respectively.

EXAMPLE XI

*1-ethyl-3-piperidylethyl-3-phenyloxindole*

A solution of 24 grams (0.1 mole) of 1-ethyl-3-phenyloxindole in 300 ml. of toluene is reacted with lithium amide and piperidylethyl chloride according to the same method as used with 1-methyl-3-phenyloxindole (Example I). The base isolated is converted to the sulfate salt and recrystallized from isopropanol. The purified salt melts at 200°–202° C. As the material contains solvent of crystallization which is very difficult to remove, the analytical sample is dried at 185° under high vacuum.

Analysis.—Calculated for $C_{23}H_{28}N_2O \cdot H_2SO_4$:

|   | Calculated | Found |
|---|---|---|
| C | 61.87 | 62.05 |
| H | 6.77 | 6.76 |
| N | 6.27 | 6.10 |

A three gram sample of the sulfate salt is dissolved in water and dilute sodium hydroxide added. The oil is taken up in ether, dried over potassium carbonate and concentrated. Last traces of solvent are removed under high vacuum, leaving the free base.

Analysis.—Calculated for $C_{23}H_{28}N_2O$:

|   | Calculated | Found |
|---|---|---|
| C | 79.26 | 79.34 |
| H | 8.10 | 8.10 |
| N | 8.04 | 8.09 |

The free base is treated with dimethyl sulfate to produce the methosulfate.

EXAMPLE XII

*1-ethyl-3-[1-(α-methylpyrrolidyl)ethyl]-3-phenyloxindole*

A solution of 24 grams of 1-ethyl-3-phenyloxindole in 300 ml. of toluene is reacted with lithium amide and α-methylpyrrolidylethyl chloride according to the same method as is used in Example I. Some of the base isolated is converted to the sulfate salt by treatment with sulfuric acid. Another portion of the base isolated is purified by distillation in vacuo and converted to the quaternary benzobromide salt by reaction with benzyl bromide.

EXAMPLE XIII

*1-ethyl-3-diethylaminoethyl-3-phenyloxindole*

Twenty grams of 1-ethyl-3-phenyloxindole is alkylated using lithium amide and diethylaminoethyl chloride. The basic oil isolated is purified by distillation, B. P. 190°–200°/0.5 mm. Yield 18 grams.

Analysis.—Calculated for $C_{22}H_{28}N_2O$:

|   | Calculated | Found |
|---|---|---|
| C | 78.54 | 78.38 |
| H | 8.38 | 8.34 |

A solution of 5 gm. of the basic oil is prepared in 200 ml. of dry ether and 5 gm. of methyl iodide added. After 12 hours, the ether is decanted from the gummy solid which separates. The gum is crystallized from isopropanol. After three recrystallizations, the solid melts at 154°–156° C.

Analysis.—Calculated for $C_{23}H_{31}N_2OI$:

|   | Calculated | Found |
|---|---|---|
| C | 57.74 | 57.95 |
| H | 6.53 | 6.51 |

EXAMPLE XIV

*1-ethyl-3-diethylaminopropyl-3-phenyloxindole*

Twenty grams of 1-ethyl-3-phenyloxindole is alkylated using lithium amide and diethylaminopropyl bromide. The basic oil isolated is purified by distillation in vacuo and converted to the quaternary methosulfate salt and the neutral sulfate by reaction with dimethyl sulfate and dilute sulfuric acid respectively.

EXAMPLE XV

*1-benzyl-3-piperidylethyl-3-phenyloxindole*

The reaction of 1-benzyl-3-phenyloxindole with piperidylethyl chloride and lithium amide was carried out according to the method of Example I. A yield of 33 gm. (80%) of basic oil was obtained from 29 gm. (0.1 mole) of 1-benzyl-3-phenyloxindole. The sulfate salt was formed in isopropanol through the addition of an equimolecular amount of the concentrated acid. The salt was recrystallized from isopropanol to a constant melting point of 249°–250° C.

*Analysis.*—Calculated for $C_{28}H_{30}N_2O \cdot H_2SO_4$:

|   | Calculated | Found |
|---|---|---|
| C | 66.13 | 65.72 |
| H | 6.34 | 6.20 |
| N | 5.50 | 5.95 |

Three grams of the purified sulfate salt was dissolved in boiling water and ammonium hydroxide added. The liberated base was extracted into ether, dried and concentrated. The last traces of solvent were removed under high vacuum to leave a glassy solid.

*Analysis.*—Calculated for $C_{28}H_{30}N_2O$:

|   | Calculated | Found |
|---|---|---|
| C | 81.90 | 81.40 |
| H | 7.33 | 7.23 |
| N | 6.80 | 6.94 |

EXAMPLE XVI

*1-benzyl-3-diethylaminoethyl-3-phenyloxindole*

The reaction of 1-benzyl-3-phenyloxindole with diethylaminoethyl chloride and lithium amide produces 1-benzyl-3 - diethylaminoethyl - 3 - phenyloxindole. This free base may be converted to quarternary and acid addition salts by treatment with ethyl iodine and dilute, alcoholic hydrochloric acid respectively.

EXAMPLE XVII

*1-benzyl-3-diethylaminopropyl-3-phenyloxindole*

1-benzyl-3-diethylaminopropyl - 3 - phenyloxindole free base, methiodide and hydrochloride are prepared by the procedure of Example I, using 1-benzyl-3-phenyloxindole and diethylaminopropyl chloride.

The invention also includes the non-toxic organic and inorganic acid addition salts of the compounds having the general formula above such as will be readily formed with, for example, organic and inorganic acids such as hydrochloric, sulfuric, sulfamic, tartaric, hydrobromic, hydriodic, glycolic, citric, maleic, phosphoric, succinic, acetic, benzoic, cinnamic, mandelic, malic, ascorbic, and the like. The method of preparation of these salts is made apparent in the example above.

This invention also contemplates the quaternary salts of the free bases of the general formula above, which may be prepared as made apparent in the examples above by treatment of the free bases with quaternary salt-forming substances. These quaternary salt-forming substances include methyl chloride, methyl bromide, methyl iodide, ethyl chloride, ethyl bromide, ethyl iodide, n-propyl chloride, n-propyl bromide, n-propyl iodide, isopropyl bromide, n-butyl chloride, n-butyl bromide, isobutyl bromide, sec.-butyl bromide, n-amyl bromide, n-hexyl chloride, benzyl chloride, benzyl bromide, methyl sulfate, ethyl sulfate, methyl benzenesulfonate, methyl p-toluenesulfonate, etc. which will react directly with any free base of the general formula above to give respectively the methochloride, methobromide, methiodide, ethochloride, ethobromide, ethiodide, n-propochloride, n-propobromide, n-propiodide, isopropobromide, n-butochloride, n-butobromide, isobutobromide, sec.-butobromide, n-amobromide, n-hexochloride, benzochloride, benzobromide, methosulfate, ethosulfate, methobenzenesulfonate, metho-p-toluenesulfonate, etc.

In this invention lithium amide is used to prepare in situ the lithio salt of 1-methyl-3-phenyloxindole, 1-ethyl-3-phenyloxindole, 1-propyl-3-phenyloxindole, 1-isopropyl-3-phenyloxindole, 1 - n - butyl-3-phenyloxindole, 1-sec.-butyl-3-phenyloxindole, 1-isobutyl-3-phenyloxindole, 1-n-amyl-3-phenyloxindole, 1-isoamyl-3-phenyloxindole, 1-n-hexyl-3-phenyloxindole, 1-(2-ethyl)-butyl - 3 - phenyloxindole, 1-benzyl-3-phenyloxindole, etc. as described in detail in the examples above.

The lithio derivatives thus prepared are alkylated in situ on the 3 carbon by such tertiary substituted aminoalkyl halides as beta-dimethylaminoethyl chloride, gamma-dimethylaminopropyl chloride, beta - ethylmethylaminoethyl chloride, gamma-ethylmethylaminopropyl bromide, beta-diethylaminoethyl bromide, gamma - diethylaminopropyl bromide, beta-di-propylaminoethyl iodide, gamma-dipropylaminopropyl iodine, beta-dibutylaminoethyl chloride, gamma-dibutylaminopropyl bromide, beta-1-piperidylethyl chloride, gamma-1-piperidylpropyl bromide, beta-1-α-pipecolylethyl chloride, gamma-1 - γ - pipecolylpropyl bromide, beta-1-pyrrolidylethyl chloride, gamma-1-pyrrolidylpropyl bromide, beta-1-(4-methylpiperazyl)ethyl chloride, gamma-1-(4-ethylpiperazyl)propyl bromide, beta-1-morpholinylethyl chloride, gamma-1-morpholinylpropyl bromide, etc. according to the procedure given in detail in the examples above.

Thus, the lithio derivatives of the substituted oxindoles of the second preceding paragraph may be employed, for example, as follows: 1-methyl-3-phenyloxindole with beta-ethylmethylaminoethyl chloride to give 1-methyl-3-β-ethylmethylaminoethyl - 3 - phenyloxindole; 1-ethyl-3-phenyloxindole with gamma-ethylmethylaminopropyl bromide to give 1-ethyl-3-γ-ethylmethylaminopropyl - 3 - phenyloxindole; 1-propyl-3-phenyloxindole with beta-dipropylaminoethyl iodide to give 1 - propyl - 3 - β - dipropyl - aminoethyl - 3 - phenyloxindole; 1 - isopropyl - 3 - phenyloxindole with gamma - dipropylaminopropyl iodide to give 1 - isopropyl - 3 - γ - dipropylaminopropyl - 3 - phenyloxindole; 1 - n - butyl - 3 - phenyloxindole with beta-dibutylaminoethyl chloride to give 1-n-butyl-3-β-di-n-butylaminoethyl-3-phenyloxindole; 1-sec. - butyl - 3 - phenyloxindole with beta-1-(4-methylpiperazyl)ethyl chloride to give 1-sec.-butyl-3-β-[1-(4-methylpiperazyl)]ethyl-3-phenyloxindole; 1-isobutyl-3-phenyloxindole with gamma-1-(4-ethylpiperazyl)propyl bromide to give 1-isobutyl-3-γ-[1-(4 - ethylpiperazyl)]propyl-3-phenyloxindole; 1-n-amyl-3-phenyloxindole with gamma - 1 - pyrrolidylpropyl bromide to give 1-n-amyl-3-[γ-(1-pyrrolidyl)]propyl-3-phenyloxindole; 1-isoamyl-3-phenyloxindole with beta-1-α-pipecolylethyl chloride to give 1-isoamyl-3-β-[1-(α-pipecolyl)]ethyl-3-phenyloxindole; 1-n-hexyl-3-phenyloxindole with gamma-[1-(γ-pipecolyl)] propyl bromide to give 1 - n - hexyl - 3 - γ - [1 - (γ - pipecolyl)]propyl - 3 - phenyloxindole; 1-(2-ethyl)butyl-3-phenyloxindole with beta-1-pyrrolidylethyl chloride to give 1-(2-ethyl)butyl-3-β-(1-pyrrolidyl)- ethyl-3-phenyloxindole; 1-benzyl-3-phenyloxindole with gamma-1-morpholinylpropyl bromide to give 1-benzyl-3-γ-(1-morpholinyl)propyl-3-phenyloxindole; etc. in accordance with the detailed directions of the examples above.

I claim:
1. A member selected from the group consisting of compounds having the structure

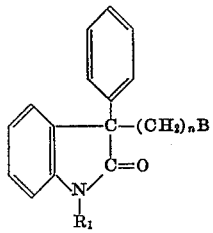

wherein $R_1$ is a member selected from the group consisting of lower alkyl and benzyl, $n$ is an integer from two to three inclusive and B is a member selected from the group consisting of lower dialkylamino, piperidino, morpholino, pyrrolidino, lower-alkyl-pyrrolidino, N'-lower-alkyl-piperazino and pipecolino; and acid addition salts and quaternary salts of said compounds.

2. 1-methyl-3-(β-1-piperidylethyl)-3-phenyloxindole.
3. 1-methyl-3-diethylaminoethyl-3-phenyloxindole.
4. 1-methyl-3-dimethylaminopropyl-3-phenyloxindole.
5. 1-ethyl-3-diethylaminoethyl-3-phenyloxindole methiodide.
6. 1-methyl-3-dimethylaminopropyl-3 - phenyloxindole methiodide.

References Cited in the file of this patent

Palazzo et al.[1]: Gazzeta chimica italiana, vol. 82, pp. 584–94, July 22, 1952.

Palazzo et al.[1]: Rendiconti isituto superiore di sanita, vol. 15, pp. 1054–64 (1952).

[1] Abstracted in Chem. Abst., vol. 47, col. 12347 (g)–49 (e).